United States Patent [19]

Manabe et al.

[11] Patent Number: 5,332,412
[45] Date of Patent: Jul. 26, 1994

[54] PROCESS FOR PRODUCING A GLASS SHEET WITH A CERAMIC COLOR COMPOSITION AND A CONDUCTIVE STRIP

[75] Inventors: Tsuneo Manabe; Jiro Chiba; Eiji Ichikura, all of Yokohama, Japan

[73] Assignee: Asahi Glass Company Ltd., Tokyo, Japan

[21] Appl. No.: 871,536

[22] Filed: Apr. 21, 1992

[30] Foreign Application Priority Data

Apr. 24, 1991 [JP] Japan .................................. 3-122263
Apr. 24, 1991 [JP] Japan .................................. 3-122265

[51] Int. Cl.⁵ .............................................. C03B 1/00
[52] U.S. Cl. ...................................... 65/60.2; 65/605; 65/60.8; 501/17; 427/419.7; 427/266; 427/269; 427/374.7
[58] Field of Search ............... 65/60.51, 60.52, 60.5, 65/60.2, 60.53, 106, 60.8; 501/17; 427/419.7, 266, 269, 374.7

[56] References Cited

U.S. PATENT DOCUMENTS

| | | | |
|---|---|---|---|
| 2,851,376 | 9/1958 | Adlassnig | 501/17 |
| 3,772,075 | 11/1973 | Tarnopol et al. | 427/266 |
| 4,373,130 | 2/1983 | Krasborn | 219/522 |
| 4,786,784 | 11/1988 | Nikodem | 219/543 |
| 4,959,090 | 9/1990 | Reinherz | 501/19 |
| 5,093,285 | 3/1992 | Murkens | 501/17 |

FOREIGN PATENT DOCUMENTS

| | | |
|---|---|---|
| 0362136 | 4/1990 | European Pat. Off. |
| 0377062 | 7/1990 | European Pat. Off. |
| 51-20210 | 2/1976 | Japan ..................... 501/17 |

OTHER PUBLICATIONS

Chemical Abstracts, 30730e, vol. 102, No. 4, Jan. 1985, & SU-A-1 114 636, Sep. 23, 1984, V. N. Lobzhanidze, et al., "Slip for Producing Viterous Coatings".
Chemical Abstracts, 108763y, vol. 90, No. 14, 1979, & SU-A-635 055, Nov. 30, 1978, p. 308, I. E. Mitnikov, et al., "Material for Obtaining an Enamel Coating on Steel".
Chemical Abstracts, 77104n, vol. 115, No. 8, Aug. 26, 1991, & Mitt. Ver. Dtsch. Emailfachleute, vol. 39, No. 3, Mar. 1991, pp. 25-33, H. W. Hennicke, et al., "Enamels with Crystalline Inclusions for the use at High Temeperatures".
Chemical Abstracts, 28988p, vol. 95, No. 4, Jul. 1981, & Stroit. Mater. Silik, Prom-St., vol. 21, No. 9, 1980, pp. 22-24, M. Iordanova, et al., "Glass-Ceramic for Metal Parts".

Primary Examiner—W. Gary Jones
Assistant Examiner—John Hoffmann
Attorney, Agent, or Firm—Oblon, Spivak, McClelland, Maier & Neustadt

[57] ABSTRACT

A process of forming a glass sheet by coating a portion of a glass sheet with a ceramic color paste, then forming a silver paste over a portion of the ceramic color paste and then firing the sheet. The ceramic color paste is of a composition which prevents the migration of silver ions to the glass plate during the firing. Migrated silver ions causes discoloration in the glass. The ceramic color composition comprising, as inorganic components, from 40 to 95 wt % of a glass powder, from 4 to 40 wt % of a heat resistant pigment powder and from 1 to 30 wt % of a boride, a nitride, a carbide, lead sulfide or a mixture thereof.

8 Claims, 1 Drawing Sheet

PROCESS FOR PRODUCING A GLASS SHEET WITH A CERAMIC COLOR COMPOSITION AND A CONDUCTIVE STRIP

BACKGROUND OF THE INVENTION

Field of the Invention

The present invention relates to a ceramic color composition and a process for producing a sheet glass by using the ceramic color composition.

Heretofore, a so-called ceramic color paste for automobiles has been commonly used, whereby a ceramic color composition is formulated into a paste and screen-printed along the peripheral portion or the center portion of a window glass of an automobile, followed by drying and baking during the bending step. This ceramic color paste is used for the purpose of forming a colored opaque layer by baking it along the peripheral portion of a blank sheet glass and thereby to prevent the deterioration of an urethane adhesive by ultraviolet rays, or to prevent the bonded portion from being seen through from outside the vehicle. As such a composition, a composition prepared by incorporating a heat resistant colored pigment to a glass powder, is known and usually has a color of black or dark gray.

On the other hand, especially in the case of a vehicle rear window glass, a silver paste is printed and baked in a pattern of lines as an electric heater to prevent fogging of the rear window glass. The electrode-forming portion (i.e. the busbar portion) may sometimes be overlapped positionwise with the baking portion of the above-mentioned ceramic color. In such a case, it is usual that a ceramic color paste and a silver paste are lap-printed on a sheet glass, followed by baking.

However, with sheet glass produced by a conventional method, it was inevitable that silver in the silver paste migrated through the ceramic color layer to reach the sheet glass and thereby to develop an amber color. Such color development makes the presence of the electrode portion of the above silver paste distinct, and thus creates a problem that the appearance of the vehicle window glass as observed from outside is thereby substantially impaired.

SUMMARY OF THE INVENTION

The present invention has been made to solve the above problem inherent to the prior art. It is an object of the present invention to effectively prevent the migration of silver in the silver paste and to present a ceramic color composition characterized in that it does not bring about amber-color development and a process for producing a sheet glass by using such a ceramic color composition.

The present invention provides a ceramic color composition comprising, as inorganic components, from 40 to 95 wt % of a glass powder, from 4 to 40 wt % of a heat resistant pigment powder and from 1 to 30 wt % of a boride, a nitride, a carbide, lead sulfide or a mixture thereof.

Further, the present invention provides a process for producing a sheet glass, which comprises preparing a ceramic color paste containing the above ceramic color composition, forming a layer of said ceramic color paste on a part of a blank sheet glass surface, forming a layer of a silver paste to cover at least a part of the layer of said ceramic cover paste, followed by heating and baking to obtain a sheet glass having a ceramic color layer laminated on a part of the blank sheet glass surface and a silver layer laminated on at least a part of the ceramic color layer.

BRIEF DESCRIPTION OF THE DRAWING

In the accompanying drawing.

DESCRIPTION OF THE PREFERRED EMBODIMENTS

Figure 1:
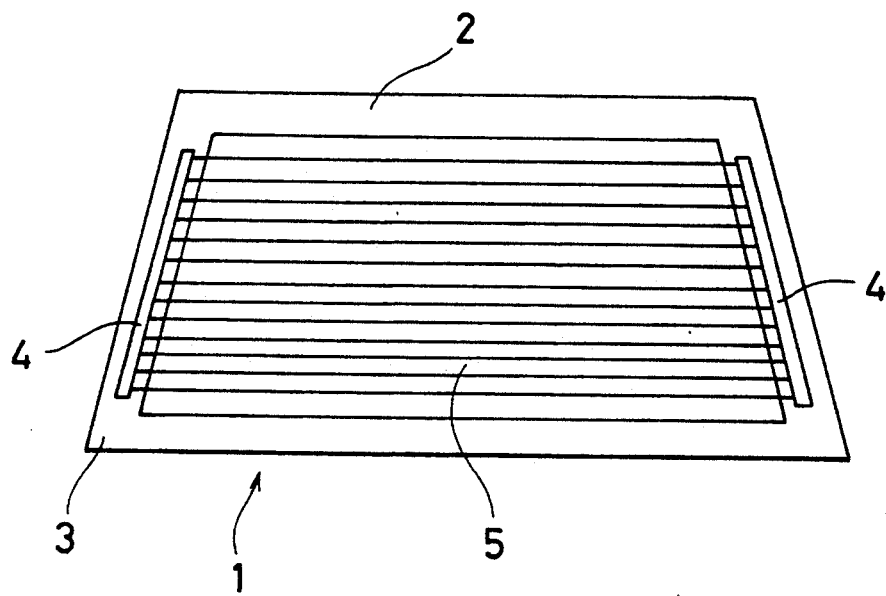
FIG. 1 is a plan view of a vehicle window glass produced by the present invention, wherein reference numeral 1 indicates a blank sheet glass, numeral 3 indicates a layer of ceramic color paste, numeral 4 indicates a busbar, and numeral 5 indicates a heater line.

Now, the present invention will be described in further detail with reference to the preferred embodiments.

The ceramic color composition of the present invention is composed mainly of the inorganic components as specified above, and an organic vehicle is incorporated thereto to form a paste. By using such a ceramic color composition, a vehicle window glass having such a ceramic color composition printed thereon and a silver paste further printed thereon, can be made free from amber-color development due to migration of silver even when baked during the usual bending step and thus free from impairment of the appearance as observed from outside the vehicle.

If the content of glass powder among inorganic components of the ceramic color composition of the present invention is less than 40 wt %, the composition tends to be hardly baked onto the blank sheet glass. On the other hand, if it exceeds 95 wt %, the amount of a component other than the glass powder i.e. a pigment, or a boride, a nitride or carbide, tends to be too small, whereby the effect for preventing migration of silver or for presenting a desired color, tends to be hardly obtainable. Such a glass powder is not particularly limited so long as it is capable of fusing to a blank sheet glass, and its composition is also not particularly limited. Various glass powders such as lead borosilicate type, lead titanium silicate type, bismuth borosilicate type and a mixture thereof may suitably be selected for use. Even for the application to vehicles, a glass powder having a similar composition may suitably be used. However, in the case of a vehicle window glass, it is common that a blank sheet glass is subjected to press bending at the same time as baking. Accordingly, the production efficiency increases when a glass powder readily releasable from the press bending mold is employed. For example, as such a ceramic color composition, a glass powder capable of fusing to the substrate glass at a temperature of from 500° to 620° C. and capable of devitrifying at a temperature of from 550° to 750° C., is suitable for this purpose.

Specifically, for example, by using a glass powder having the following composition as represented by weight %, it is possible to obtain a ceramic color composition which provides high efficiency for the production of a sheet glass for a vehicle window glass.

| | |
|---|---|
| $SiO_2$ | 13–29 |
| $Al_2O_3 + La_2O_3$ | 0.1–5 |
| $PbO$ | 50–75 |
| $TiO_2 + ZrO_2 + SnO_2$ | 4–20 |
| $B_2O_3$ | 0–6 |
| $Li_2O + Na_2O + K_2O$ | 0–5 |
| $MgO + CaO + SrO + BaO$ | 0–5 |
| $P_2O_5$ | 0–5 |

-continued

| | |
|---|---|
| F | 0–2 |

There is no particular restriction as to the particle size of this glass powder. However, the average particle size is preferably at most 30 μm.

The reasons why a devitrifiable glass powder having the above composition is preferred, are as follows.

$SiO_2$: This is a glass network former and is essential to control the chemical, thermal and mechanical properties. If the amount is less than 13 wt %, the chemical durability tends to be poor, such being undesirable. If the amount exceeds 29 wt %, the glass softening point tends to be too high to accomplish baking onto the glass surface at a desired bending temperature. The amount is preferably from 15 to 27 wt %.

$Al_2O_3+La_2O_3$: These materials are essential for improving the chemical durability. If the amount is less than 0.1 wt %, no adequate effects will be obtained. If the amount exceeds 5 wt %, the softening point of glass tends to increase, whereby baking at a desired temperature will be difficult. The amount is preferably from 0.5 to 4 wt %.

PbO: This is essential as a flux component and a devitrifying component. If the amount is less than 50 wt %, the glass softening point tends to be too high, such being undesirable. If the amount exceeds 75 wt %, the chemical durability tends to be poor, such being undesirable. The amount is preferably from 52 to 73 wt %.

$TiO_2+ZrO_2+SnO_2$: These materials are essential for improving the devitrification and chemical durability. If the amount is less than 4 wt %, devitrification tends to be difficult at a desired temperature range, such being undesirable. If the amount exceeds 20 wt %, devitrification occurs during the melting of glass, such being undesirable. The amount is preferably from 6 to 18 wt %.

$B_2O_3$: This is not an essential component, but may be incorporated in an amount of up to 6 wt % as a flux component. If the amount exceeds 6 wt %, the chemical durability tends to be poor, such being undesirable.

$Li_2O+Na_2O+K_2O$: These materials are not essential components, but may be incorporated in an amount of up to 5 wt % as flux components. If the amount exceeds 5 wt %, the thermal expansion coefficient tends to be large, such being undesirable.

$MgO+CaO+SrO+BaO$: These materials are not essential components, but may be incorporated in an amount of up to 5 wt % for the purpose of improving the solubility and controlling the thermal expansion coefficient. If the amount exceeds 5 wt %, the chemical durability tends to be poor.

$P_2O_5$: This may be incorporated in an amount of up to 5 wt % for the purpose of improving the chemical durability (particularly the acid resistance). If the amount exceeds 5 wt %, devitrification tends to take place during the melting of glass, such being undesirable.

F: This may be incorporated in an amount of up to 2 wt % for the purpose of improving the chemical durability (particularly the acid resistance). If the amount exceeds 2 wt %, devitrification tends to take place during the melting of glass, such being undesirable.

Such a glass powder is a devitrifiable glass, which precipitates large amounts of lead titanate and lead silicate as main crystals in a temperature range of from 570° to 700° C. Such a temperature range corresponds to a temperature range for bending treatment of soda lime silica sheet glass for vehicle glass. Accordingly, if the above-mentioned devitrifiable glass powder is coated on a desired portion of a sheet glass, and the sheet glass is subjected to heat bending, the glass powder will be devitrified, and the apparent viscosity will be high, whereby adhesion to the press mold of the bending apparatus can be avoided.

If the content of the heat resistant pigment among the inorganic components of the composition of the present invention is less than 4 wt %, a color of a desired density tends to be hardly obtainable. On the other hand, if it exceeds 40 wt %, the glass powder content tends to be so little that baking to the sheet glass tends to be poor. Such a pigment may be the same as used for conventional ceramic color compositions and includes, for example, an oxide of copper chromium, an oxide of iron manganese, an oxide of iron and an oxide of titanium. Further, a material which has been commonly used as a filler such as alumina, silica or zircon may also be included in the above heat resistant pigment, although such a filler does not present a color.

For the composition of the present invention, it is important that it contains, as the inorganic components, not only the glass powder and the heat resistant pigment but also a predetermined amount of a powder of a boride, nitride, a carbide or a mixture thereof, as an essential component, whereby for the first time, the effect for preventing migration of silver intended by the present invention can be accomplished.

The content of the boride, the nitride, the carbide, lead sulfide or a mixture thereof in the inorganic components of the composition of the present invention is preferably from 1 to 30 wt % in a total amount. If the total amount is lower than 1 wt %, no adequate effect for preventing migration of silver tends to be obtainable. On the other hand, if it exceeds 30 wt %, the amount of the glass powder tends to be low, whereby baking to the blank sheet glass tends to be inadequate. In the present invention, such boride, nitride and carbide include solid solutions of carbonitride and borocarbide in their scopes.

A material within this scope has the effect for preventing migration of silver. As such a boride, lanthanum boride, zirconium boride or titanium boride may, for example, be mentioned. As the nitride, silicon nitride, aluminum nitride or titanium nitride, may, for example, be mentioned. As the carbide, silicon carbide, boron carbide or titanium carbonitride may be mentioned. Among them, titanium boride, nitride, carbide and carbonitride as well as boron carbide present particularly high effects. There is no particular restriction as to the purities and the manner of their production. However, the smaller the particle size, the higher the effect for preventing migration of silver. Therefore, the average particle size is preferably at most 30 μm.

The ceramic color composition of the present invention is prepared into a paste by uniformly dispersing and kneading the predetermined amounts of the above inorganic components and an organic vehicle. Here, this organic vehicle may be the one prepared by dissolving a polymer such as ethyl cellulose, an acrylate resin, a styrene resin or a phenol resin in a solvent such as α-terpineol, butylcarbitol, an acetate or a phthalate.

A sheet glass employing such a ceramic color composition, may be produced as follows.

The above-mentioned various inorganic components of the present invention and the organic vehicle are thoroughly kneaded to prepare a ceramic color paste.

The viscosity of this ceramic color paste is preferably at a level of from 2,000 to 200,000 poise from the viewpoint of operation efficiency.

Then, as shown in FIG. 1, this ceramic color paste is screen-printed to form a ceramic color paste layer at a predetermined portion on the surface of a blank sheet glass.

To produce a sheet glass for a vehicle window glass, a ceramic color paste layer 3 having a thickness of from 5 to 50 μm and a width of from 10 to 200 mm, is formed along the periphery 2 on the surface of a blank sheet glass 1. Then, this ceramic color paste layer 3 is dried. Such drying may be conducted at room temperature. However, by heating at a temperature of from 100° to 200° C. for from 0.5 to 20 minutes, the productivity can be improved. Further, drying may be facilitated by irradiating ultraviolet rays.

Then, to form on the sheet glass surface an electric heater for removal of fogging, a silver paste is printed on at least a part of the ceramic color paste layer 3 so that the ceramic color paste layer and the silver paste layer are partially overlapped. In the embodiment shown in FIG. 1, busbars 4 for the electric heater were sealed by the ceramic color paste so that the busbars 4 are not visible from outside the vehicle, and a plurality of linear heater lines 5 are formed between the busbars 4.

Such a silver paste may be the one prepared by mixing the above-mentioned organic vehicle with inorganic components comprising from 80 to 95 wt % of a silver powder and from 5 to 20 wt % of a glass powder.

In the case of a vehicle window glass, a silver paste layer having a thickness of from 5 to 30 μm and a width of from 1 to 30 mm, may be used. Usually, a silver paste is printed in a predetermined pattern to form antenna lines, heater lines or lead lines, also on the site where no ceramic color paste layer is present, i.e. on the surface of the sheet glass. Then, the silver paste layer is dried and then baked to obtain a sheet glass having a ceramic color layer and a silver layer formed on the sheet glass.

This baking is conducted under such conditions that the organic vehicle in the paste will be removed, and the glass powder is baked to the substrate glass. When the sheet glass is made of usual soda lime silica, such baking can be accomplished by maintaining a temperature of from 550° to 750° C. for from 0.5 to 30 minutes. When a sheet glass for a vehicle window glass is to be produced, it is preferred from the viewpoint of improvement of the productivity to conduct heating for bending operation or at least a part of the bending operation at the same time as the above baking step. Specifically, it is preferred that during the heating step for the above baking, the sheet glass is heated for the subsequent second bending operation or subjected to gravity bending. Then, as the case requires, this sheet glass is subjected to press bending, sag bending or airfoam bending.

Now, the present invention will be described in further detail with reference to Examples. However, it should be understood that the present invention is by no means restricted by such specific Examples.

EXAMPLE 1

A glass powder having the composition and particle size distribution as identified in Table 1, a heat resistant black pigment (an oxide of copper chromium, #9510, manufactured by Dainichi Seika Kogyo K.K.) and a boride, a nitride, a carbide or a mixture thereof, were mixed at the blending ratio as identified in Tables 2 and 3. To 80 parts by weight of this powder mixture, 20 parts by weight of an α-terpineol solution having 10 wt % of ethyl cellulose dissolved therein was added, the mixture was kneaded and uniformly dispersed by a three roll mill to adjust it to a desired paste viscosity to obtain a ceramic color composition in a paste form.

This paste was screen-printed on a blank sheet glass of common soda lime silica to form a ceramic color paste layer having a thickness of about 30 μm. Then, the printed layer was heated at 100° C. for 5 minutes, followed by drying. Then, a silver paste was printed so that it overlaps the ceramic color paste layer, followed by drying. The printed blank sheet glass was introduced into an electric furnace maintained at 700° C. and heated for 4 minutes for baking to obtain a sheet glass having a ceramic color layer and a silver layer.

The baked sheet glass was measured by a calorimeter (CR200, manufactured by Minolta Camera Co., Ltd.) from the non-printed side. The color difference of the lap-printed portion was determined using as a standard the portion where no silver paste was lap-printed within the area where the ceramic color composition was printed. The results of this evaluation are shown in Tables 2 and 3. Here, the smaller the color difference, the better the suppression of the amber color development due to migration of silver. When ΔE was 1.5 or less, no difference in the color was visually observed, and no distinction was possible by visual observation.

TABLE 1

| Composition of glass (wt %) | $PbO$: 65 |
| --- | --- |
| | $SiO_2$: 20 |
| | $TiO_2$: 10 |
| | $B_2O_3$: 4 |
| | $Na_2O$: 1 |
| Particle size distribution of glass powder | Less than 5 μm: 75% |
| | 5–10 μm: 20% |
| | 10–20 μm: 5% |

TABLE 2

| Example No. | Boride, nitride or carbide Material | Amount (wt %) | Amount of glass (wt %) | Amount of heat resistant pigment (wt %) | Color difference ΔE |
| --- | --- | --- | --- | --- | --- |
| 1 | Lanthanum boride | 10 | 70 | 20 | 1.2 |
| 2 | Zirconium boride | 20 | 50 | 30 | 1.4 |
| 3 | Titanium boride | 10 | 70 | 20 | 0.3 |
| 4 | Titanium boride | 3 | 85 | 12 | 0.7 |
| 5 | Titanium boride | 20 | 50 | 30 | 0.5 |
| 6 | Silicon nitride | 10 | 84 | 6 | 0.9 |
| 7 | Aluminum nitride | 3 | 91 | 6 | 1.5 |
| 8 | Titanium nitride | 5 | 85 | 10 | 0.6 |
| 9 | Silicon carbide | 10 | 70 | 20 | 1.5 |
| 10 | Titanium carbide | 5 | 65 | 30 | 0.5 |

TABLE 2-continued

| Example No. | Boride, nitride or carbide | | Amount of glass (wt %) | Amount of heat resistant pigment (wt %) | Color difference ΔE |
| --- | --- | --- | --- | --- | --- |
| | Material | Amount (wt %) | | | |
| 11 | Boron carbide | 10 | 70 | 20 | 0.3 |

TABLE 3

| Example No. | Boride, nitride or carbide | | Amount of glass (wt %) | Amount of heat resistant pigment (wt %) | Color difference ΔE |
| --- | --- | --- | --- | --- | --- |
| | Material | Amount (wt %) | | | |
| 12 | Boron carbide | 3 | 70 | 27 | 0.6 |
| 13 | Boron carbide | 20 | 60 | 20 | 0.5 |
| 14 | Titanium carbonitride | 5 | 70 | 25 | 0.5 |
| 15 | Titanium boride | 1 | 69 | 20 | 0.2 |
| | Lanthanum boride | 10 | | | |
| Comparative Example | — | — | 80 | 20 | 6.5 |

EXAMPLE 2

70 wt % of a glass powder having the composition and particle size distribution as identified in Table 1, 20 wt % of a heat resistant black pigment (an oxide of copper chromium, #9510, manufactured by Dainichi Seika Kogyo K.K.) and 10 wt % of lead sulfide (reagent, manufactured by Kishida Kagaku K.K.) were mixed. To 80 parts by weight of this powder mixture, 20 parts by weight of an α-terpineol solution having 10 wt % of ethyl cellulose dissolved therein, was added, and the mixture was kneaded and uniformly dispersed by a three roll mill to adjust it to a desired paste viscosity to obtain a ceramic color composition of a paste form.

Using this composition, a sheet glass having a ceramic color layer and a silver layer formed thereon was prepared in the same manner as in Example 1. With respect to this sheet glass, the color difference of the portion where the silver paste was lap-printed, was obtained in the same manner as in Example 1, whereby the color difference was found to be 1.2.

EXAMPLE 3

The preparation of the paste, printing and baking were conducted in the same manner as in Example 1 except that a powder mixture obtained by mixing 77 wt % of the glass powder, 20 wt % of the heat resistant black color pigment and 3 wt % of lead sulfide, was used. This baked sheet glass was visually observed from the non-printed side, whereby with respect to the area where the ceramic color composition was printed, there was no difference in the color and no distinction was possible between the portion where the silver paste was lap-printed and the portion where no silver paste was lap-printed.

Further, the color difference of the portion where the silver paste was lap-printed, was measured in the same manner as in Example 1, whereby the color difference was found to be 1.2.

EXAMPLE 4

The preparation of the paste, printing and baking were conducted in the same manner as in Example 1 except that a powder mixture prepared by mixing 60 wt % of the glass powder, 20 wt % of the heat resistant black color pigment and 20 wt % of lead sulfide, was used. This baked sheet glass was visually observed from the non-printed side, whereby with respect to the area where the ceramic color composition was printed, there was no difference in the color and no distinction was possible between the portion where the silver paste was lap-printed and the portion where no silver paste was lap-printed.

Further, the color difference of the portion where the silver paste was lap-printed, was measured in the same manner as in Example 1, whereby the color difference was found to be 1.3.

When lap-printed with a silver paste, the ceramic color composition of the present invention effectively prevents migration of silver during the baking, whereby amber color development can be prevented.

Further, according to the present invention, it is possible to produce a sheet glass having an excellent appearance free from such amber color development, particularly a vehicle window glass having an excellent appearance.

We claim:

1. A process for producing a sheet glass, which comprises:

preparing a ceramic color paste containing a ceramic color composition comprising, as inorganic components, from 40 to 95 wt. % of a glass powder, from 4 to 40 wt. % of a powdered pigment and from 1 to 30 wt. % of a boride, a nitride, titanium carbide, silicon carbide, lead sulfide or a mixture thereof;

forming a layer of said ceramic color paste on a portion of a blank sheet glass surface; and forming a layer of a silver paste to cover at least a portion of the layer of said ceramic color paste, followed by heating and baking, thereby preparing a sheet glass having a ceramic color layer laminated on a portion of the blank sheet glass surface and a silver layer laminated on at least a portion of the ceramic color layer.

2. The process of claim 1, wherein at least a portion of bending processing is applied to the blank sheet glass in the baking step.

3. The process of claim 1, wherein said boride or said nitride is a titanium boride or nitride.

4. The process of claim 1, wherein said boride is boron carbide.

5. A process for producing a glass sheet for a vehicle window glass, which comprises:

preparing a ceramic color past containing a ceramic color composition comprising, as inorganic components, from 40 to 95 wt. % of a glass powder, from 4 to 40 wt. % of a powdered pigment and from 1 to 30 wt. % of a boride, a nitride, titanium carbide, silicon carbide, lead sulfide or a mixture thereof;

forming a layer of said ceramic color paste on a portion of a blank sheet glass surface; and forming a layer of a silver past to cover at least a portion of the layer of said ceramic color paste, followed by heating and baking, thereby preparing a sheet glass for a vehicle window glass having a ceramic color layer laminated on a portion of the blank sheet glass surface and a silver layer laminated on at least a portion of the ceramic color layer.

6. The process of claim 5, wherein at least a portion of bending processing is applied to the blank sheet glass in the baking step.

7. The process of claim 5, wherein said boride or nitride is a titanium boride or nitride.

8. The process of claim 5, wherein said boride is boron carbide.

* * * * *